R. L. BURD.
PISTON RING.
APPLICATION FILED AUG. 8, 1917.

1,356,258. Patented Oct. 19, 1920.

UNITED STATES PATENT OFFICE.

ROY L. BURD, OF ROCKFORD, ILLINOIS, ASSIGNOR TO BURD HIGH COMPRESSION RING COMPANY, OF ROCKFORD, ILLINOIS, A CORPORATION OF ILLINOIS.

PISTON-RING.

1,356,258.  Specification of Letters Patent.  Patented Oct. 19, 1920.

Application filed October 8, 1917. Serial No. 195,312.

*To all whom it may concern:*

Be it known that I, ROY L. BURD, a citizen of the United States, residing at Rockford, Winnebago county, Illinois, have invented certain new and useful Improvements in Piston-Rings, of which the following is a specification.

It is well known that piston rings as cast and finished develop slight irregularities, due doubtless to the releasing of strains in the iron which cause a slight warping thereof. Whatever the occasion of the defect, it is common practice and experience that the rings when first adjusted to the engines in which they are used do not seat perfectly and consequently there is a slight leakage of oil about the same with the wellknown results in the way of carbonized oil in the explosion chamber of the cylinder. It is the purpose of the present invention to provide a ring which will quickly be reduced to a perfect fit in the cylinder without undergoing the prolonged operation which is essential to the seating of piston rings as ordinarily constructed.

Figure 3:
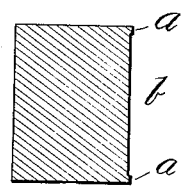
Figure 2:
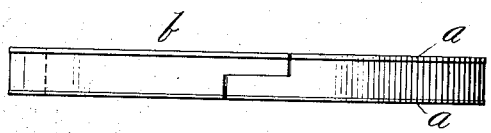
Figure 1:
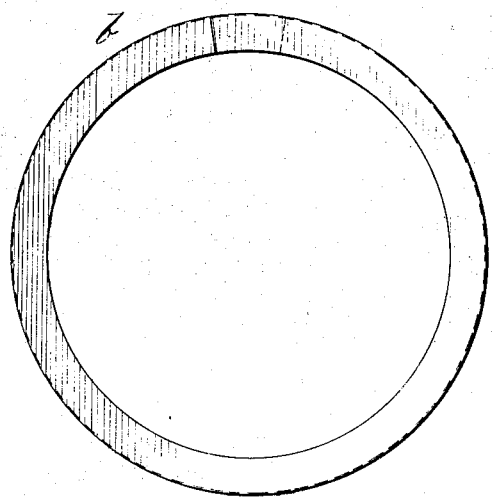

In the accompanying drawing Figure 1 is a face view of a piston ring embodying my invention; Fig. 2 an edge view, and Fig. 3 a cross section of such a ring on a slightly enlarged scale.

Except in the respect hereinafter mentioned the piston ring is or may be similar to or identical with the piston rings in common use. The ring $b$ may be cast as usual and of a size to fit the interior of the cylinder with which it is to be used after it has been machined and split as usual. The finished ring, however, differs from those of the prior art known to me in that it is made or finished on the outer surface with marginal ribs or flanges $a$, $a$, of a height which is preferably approximately .002 of an inch, between which ribs extends the cylindrical outer surface $b$ of the body of the ring. The ribs are not only minute in height but are very slight in breadth and are of equal and even elevation throughout the circumference of the ring.

In the ordinary ring upon which my invention is an improvement the necessary width is such that it presents a considerable bearing surface between which and the internal wall of the cylinder is confined a body of lubricant, during the operation of the machine, which lubricant greatly prolongs the time necessary to wear down the relatively wide surface of the ring to an accurate fit with the cylinder. In my improved ring on the other hand, the marginal ribs or flanges are of such slight width that there is but little metal to be worn away and furthermore because of the slight width the ribs scrape away the oil and form a closer contact with the wall of the cylinder than would be possible with a broader band. It follows that when a ring of this construction is put in a cylinder it quickly wears the ribs to a perfect fit, but the amount of rapid wear is limited by the very slight elevation of the ribs which soon brings the main body or surface of the ring into contact with the cylinder.

I claim:

1. A piston ring, the outer peripheral surface of which is cylindrical with marginal ribs thereon extending approximately .002 of an inch beyond the cylindrical surface.

2. A piston ring, the outer peripheral surface of which is substantially cylindrical with marginal ribs thereon of such height that they will quickly wear away at points of contact with the cylinder to permit the ring to engage the cylinder at such points throughout the width of the ring and without permitting the ends of the ring to separate unduly.

ROY L. BURD.